July 8, 1952  J. ROSENBERG  2,602,212

APPARATUS FOR THE MATERIAL FEED IN MACHINE TOOLS

Filed Feb. 2, 1949

INVENTOR
Josef Rosenberg
BY
ATTORNEY

Patented July 8, 1952

2,602,212

UNITED STATES PATENT OFFICE 2,602,212

APPARATUS FOR THE MATERIAL FEED IN MACHINE TOOLS

Josef Rosenberg, Pilsen, Czechoslovakia, assignor to Skoda Works, National Corporation, Pilsen, Czechoslovakia Application February 2, 1949, Serial No. 74,210
In Czechoslovakia March 24, 1948

1 Claim. (Cl. 29—59)

My invention relates to improvements in bar stock feed mechanisms for machine tools provided with a hollow receiving spindle and with a stock tube in alignment therewith.

In known mechanisms of this type the stock bar slidably resting in the stock tube is pushed into the hollow receiving spindle by a thrust tube or a similar rigid member which enters the stock tube in axial direction and which necessarily has to be longer than said stock tube. This arrangement at least doubles the length of the feed mechanism and extends excessively the overall structural length of the machine tool.

The principal object of my invention is to overcome the said disadvantages, and other objects of my invention will appear from the following description.

According to my invention I use in combination with the stock tube mentioned above a J-shaped extension therefor having its longer arm at least essentially parallel to said stock tube, said extension housing an axially displaceable flexible rod-like thrust or pushing member reaching with its forward end into said stock tube and adapted to engage therein the rear end of the stock bar which is moved by said pushing member into the hollow receiving spindle of the machine tube. The said rod-like thrust or pushing member is preferably constituted by a wired rope-like or cable-like member of the known transmission type which though flexible is resistant against deformations in axial direction. This flexible thrust or pushing member may be actuated by a pinion directly engaging therewith.

Figure 1:
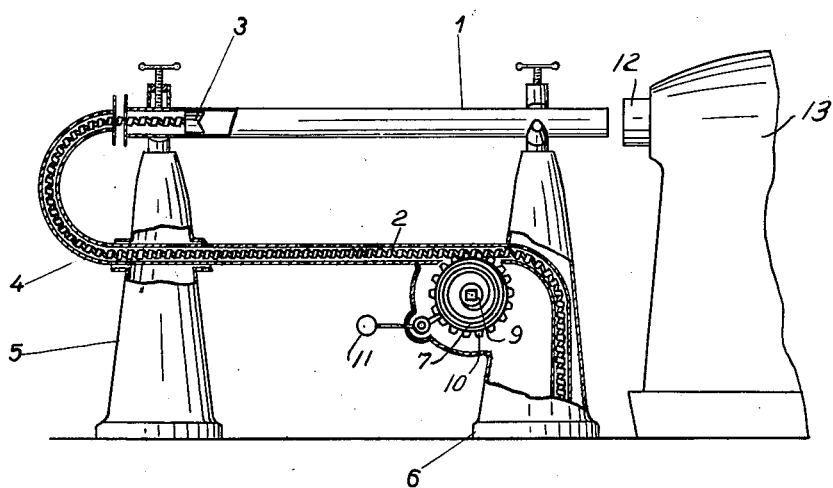
Figure 2:
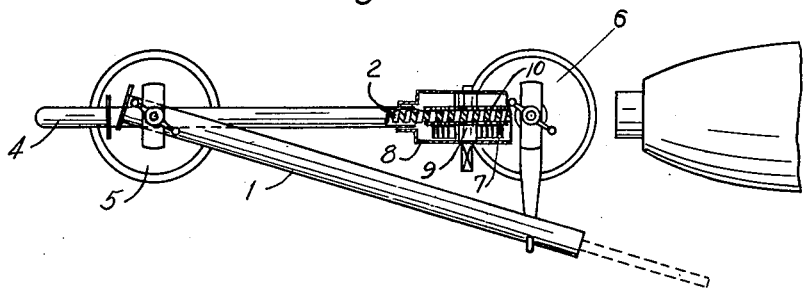

The feed mechanism forming the subject matter of my invention will be readily understood from the following description of an embodiment thereof when taken with the accompanying drawing in which Fig. 1 is a view in front elevation, partly in section, of my new feeding mechanism and of a part of the machine tool, and Fig. 2 is a top view thereof.

The stock bar indicated in dotted lines in Fig. 2 is slidably resting in the stock tube 1 which is tiltably mounted upon the stand 5. Said stock tube 1 may be tilted from a position aligning with the hollow receiving spindle 12 of the machine tool 13, as shown in Fig. 1, to the position shown in Fig. 2 to receive the stock bar. The stock tube 1 is provided with a J-shaped extension 4 whose longer arm is arranged below said stock tube 1 in a parallel position thereto and is supported by the stands 5 and 6. A flexible rod-like thrust or pushing member 2 is slidably resting in said extension 4 and may be moved forward into and within the stock tube 1 to push with its head 3 the bar stock into the receiving spindle 12. The thrust or pushing member 2 is actuated by the pinion 10 which engages the surface thereof. Said pinion 10 is mounted upon the shaft 9 which may be turned by a helical spring 7 or by equivalent means, for example by a weighted cord attached to said shaft 9. The said pinion 10 may be turned and the spring 7 loaded by a crank shaft, not shown in the drawing, which may be attached to the square end of the shaft 9. Any rotation of the pinion 10 under the influence of the spring 7 or the like may be arrested by the pawl 11.

My feeding mechanism operates as follows:

First the thrust or pushing member 2 is withdrawn from the stock tube 1 into the extension 4. The spring 7 is loaded and the pinion 10 arrested by the pawl 11. The stock tube 1 is tilted into the position shown in Fig. 2, the stock bar is introduced therein and said stock tube returned into the position shown in Fig. 1 to align with the hollow receiving spindle 12. Thereafter the arresting means for the pinion 10 are released and the pinion engaging directly the thrust or pushing member 2 forces the same against the bar stock resting in the stock tube 1, which bar stock is thus moved forward into the receiving spindle 19.

While a specific embodiment of my invention has been shown and described in detail to illustrate the application of the principle of my invention, it will be understood that the same may be otherwise embodied without departing from such principles.

What I claim as my invention is:

A bar stock feeding mechanism for machine tools having a hollow work receiving spindle, comprising in combination, a stock tube arranged in axial alignment with said receiving spindle, a J-shaped extension for said stock tube, the longer arm thereof being at least essentially parallel to the latter, a flexible rod-like pushing member slidably mounted in said extension and reaching with its forward end into said stock tube, said pushing member adapted to engage with its forward end the rear end of the stock bar sliding the same into the hollow receiving spindle, a grooved surface on the rear portion of said pushing member, a pinion engaging said grooved surface portion, a helical spring actuating said pinion, and means to hold said spring in loaded position.

JOSEF ROSENBERG.

(References on following page)

REFERENCES CITED

The following references are of record in the file of this patent:

UNITED STATES PATENTS

| Number | Name | Date |
|---|---|---|
| 2,043,772 | Rich | June 9, 1936 |
| 2,451,367 | Twainley | Oct. 12, 1948 |

FOREIGN PATENTS

| Number | Country | Date |
|---|---|---|
| 188,669 | Switzerland | Apr. 16, 1937 |
| 571,614 | Germany | Mar. 8, 1933 |
| 596,166 | France | Oct. 17, 1925 |